United States Patent [19]
Malloy et al.

[11] Patent Number: 4,805,752
[45] Date of Patent: Feb. 21, 1989

[54] VARIABLE CAPACITY TORQUE TRANSMITTER

[75] Inventors: John D. Malloy, Troy; John E. Mahoney, West Bloomfield, both of Mich.

[73] Assignee: General Motors Corporation, Detroit, Mich.

[21] Appl. No.: 170,773

[22] Filed: Mar. 21, 1988

[51] Int. Cl.⁴ .................... F16D 25/063; F16D 25/14
[52] U.S. Cl. ............................ 192/85 AA; 192/106 F
[58] Field of Search .......... 192/106 F, 109 F, 85 AA, 192/56 F

[56] References Cited

U.S. PATENT DOCUMENTS

| | | | |
|---|---|---|---|
| 2,766,864 | 10/1956 | Schilling et al. | 192/85 AA |
| 3,410,378 | 11/1968 | Maurice | 192/3.33 |
| 3,482,669 | 12/1969 | Foster-Pegg | 192/56 F X |
| 3,557,635 | 1/1971 | Tuck | 192/56 F X |
| 3,734,251 | 5/1973 | Annis et al. | 192/3.3 |
| 4,083,442 | 4/1978 | Ushijima | 192/56 F X |
| 4,216,852 | 8/1980 | Ushijima | 192/56 F X |
| 4,225,029 | 9/1980 | Ushijima | 192/56 F X |

FOREIGN PATENT DOCUMENTS 726652  10/1942  Fed. Rep. of Germany ........ 192/85 AA

*Primary Examiner*—Rodney H. Bonck
*Attorney, Agent, or Firm*—Donald F. Scherer

[57] ABSTRACT

A fluid operated friction torque transmitting device has an apply piston disposed in a housing. An apply chamber having a predetermined area is formed on one side of the piston, and an opposing or compensating chamber of lesser area is formed on the other side of the piston. A torque transmitting shaft and an inner hub portion of the housing cooperate to form a rotary valve member which is operable to connect the apply chamber to high fluid pressure and the opposing chamber to low fluid pressure, when torque is transmitted from the input side of the transmitter to the output side of the transmitter; and to connect both the apply chamber and the opposing chamber to high fluid pressure when torque is being transmitted from the output side of the transmitter to the input side of the transmitter.

2 Claims, 1 Drawing Sheet

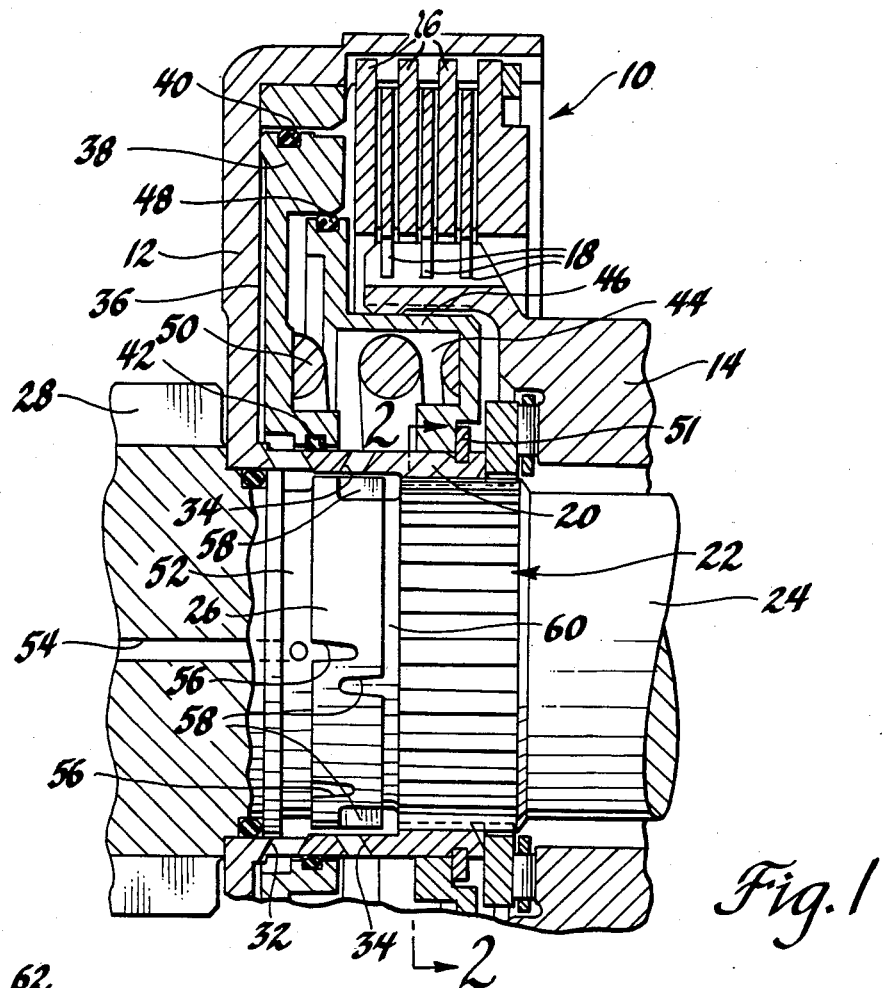
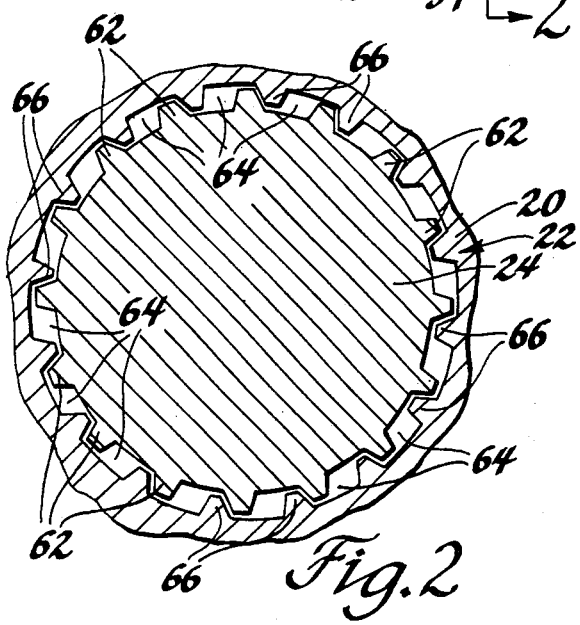
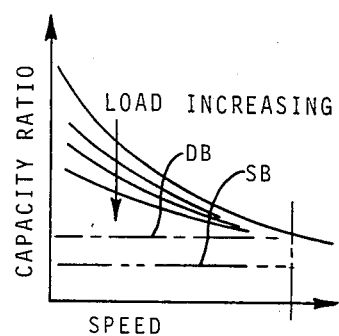
Fig.1
Fig.2
Fig.3

VARIABLE CAPACITY TORQUE TRANSMITTER

BACKGROUND OF THE INVENTION

This invention relates to fluid operated friction torque transmitting devices and more particularly to such devices having a variable torque capacity.

It is known that directional torque sensitivity can be provided within a clutch or brake arrangement to sense torque reversal during a ratio interchange in a power transmission. During the ratio interchange, torque is transferred from an off-going friction device to an on-coming friction device. As the torque capacity increases at the on-coming friction device, the off-going friction device will undergo a decrease in torque transmission and will experience a negative or torque reversal if not released at the proper time. If the desired shift timing is not accomplished; i.e., torque reversal occurs, a transient force termed "shift shock" will occur.

The shift timing has generally been accomplished through the use of one-way type devices which are designed to transmit torque in only one direction. These devices do, however, add cost and complexity to the transmission. If a brake member is to be the off-going device during a ratio interchange, it is possible to use a band type brake, especially a multiwrap type, to provide some directional sensitivity to torque transmissions. These devices also have limitations in their design and operation which make them less than the ideal solution to the problem. This directional torque sensitivity is fixed and is not sensitive to load or speed.

In rotating type clutches, it has been proposed to use a directional sensitive valve member which is operable to exhaust the clutch apply chamber during a torque reversal. These types of devices have been proposed for torque converter clutch mechanisms to permit disengagement of the torque converter clutch when the operator changes from a driving to a coasting condition. Devices of this type can be seen in U.S. Pat. No. 3,734,251 issued May 22, 1973, to Annis et al. and U.S. Pat. No. 3,410,378 issued Nov. 12, 1968, to Maurice.

SUMMARY OF THE INVENTION

The present invention seeks to improve multidisc friction torque transmitters by reducing the torque capacity thereof during a torque reversal through the transmitter. As mentioned above, a torque reversal can occur when the vehicle operation is changed from drive to coast or during a ratio interchange within the transmission. The torque reversal during ratio interchange can create torque spikes or transient torque loads within the transmission gearing if the off-going friction device is not released at the proper time.

The present invention provides a variable capacity multidisc friction device, such as a clutch or brake, that compensates for both torque load and rotary speed. This device, when used with a clutch, will allow more shift overlap at high speeds and torques to ensure clutch durability while reducing sensitivity to shift timing error.

During low rotary speeds and light torque loads where shift timing error is most noticeable, the present invention provides increased directional sensitivity for more accurate overlap control to improve shift quality through the reduction of shift shock. The present invention is especially beneficial during a closed throttle coasting downshift or step-out upshifts at low vehicle speeds. Under these conditions, the present invention provides good directional sensitivity with performance similar to the use of a one-way device.

The present invention accomplishes these improvements through the use of a compensating pressure chamber which is formed adjacent the apply piston of a friction device and a rotary valve which is sensitive to the direction of torque transmission. The compensating chamber, during normal operation with the device engaged, is open to a low pressure fluid source, such as a lubrication circuit, and will provide a centrifugal pressure force which will counterbalance at least a portion of the centrifugal pressure in the apply chamber.

To provide load sensitivity or directional sensitivity, the compensating chamber is connected through the rotary valve to the device apply pressure which is generally a load sensitive pressure. Thus, the compensating force is proportional to the level of torque transmitted.

The present invention will be found most useful in rotary type clutches as used in countershaft or planetary type automotive shifting transmissions.

It is therefore an object of this invention to provide an improved fluid operated friction torque transmitting device wherein the fluid apply pressure is at least partially offset by fluid pressure in a compensating chamber when a change in the direction of torque transmission occurs.

It is another object of this invention to provide an improved fluid operated friction torque transmitting device wherein a fluid operated piston has an apply chamber and an opposing compensating chamber, which in one direction of torque transmission is filled with low pressure oil to provide centrifugal compensation, and upon torque reversal, is filled with fluid at a high pressure to compensate at least partially for the high pressure in the apply chamber.

It is yet another object of this invention to provide an improved fluid operated friction clutch wherein an apply piston has a fluid apply chamber, an opposing fluid chamber and a rotary valve, wherein the rotary valve is operable to connect the opposing chamber to a low pressure fluid source during normal clutch application to provide a centrifugal compensating fluid and during a torque reversal through the clutch, the rotary valve is operable to connect the opposing chamber to a high pressure fluid source thereby providing fluid pressure compensation for both apply pressure forces and centrifugal pressure forces.

These and other objects and advantages of the present invention will be more apparent from the following description and drawings.

BRIEF DESCRIPTION OF THE DRAWINGS

FIG. 1 is an elevational view, partially in cross section, of a rotary clutch incorporating the present invention.

FIG. 2 is a view taken along line 2—2 of FIG. 1.

FIG. 3 is a chart depicting capacity ratio vs. speed for devices incorporating the present invention.

DESCRIPTION OF THE PREFERRED EMBODIMENT

Referring to the drawing, wherein like characters represent the same or corresponding parts throughout the several views, there is seen in FIG. 1 a rotating clutch device, generally designated 10. The clutch 10 includes an input housing 12, an output hub 14 and a plurality of friction discs 16, connected with the housing 12, and friction discs 18 connected with the hub 14. The housing 12 has an inner hub portion 20 which is drivingly connected through a spline connection, generally designated 22, to a rotary shaft 24. The rotary shaft 24 has formed thereon a rotary valve element 26 and a gear element 28.

The hub 20 has a plurality of apply feed passages 32 and opposing chamber passages 34 formed thereon. The passages 32 are in fluid communication with an apply chamber 36 formed between the housing 12 and an apply piston 38 which is slidably disposed within the housing 12. The apply chamber 36 is sealed from leakage to atmosphere by a pair of annular seals 40 and 42.

The passages 34 are in fluid communication with an opposing fluid chamber 44 which is formed between the piston 38 and a wall structure 46. The wall structure 46 is sealed from leakage to atmosphere at the outer periphery thereof by an annular seal 48 while the inner periphery is sealingly disposed on the hub 20. A clutch return spring 50 is also disposed in the chamber 44 and is operable to urge the piston 38 to a disengaged position shown in FIG. 1 and also to urge the wall structure 46 into abutment with a locating ring 51.

The hub 14 is preferably connected to another gear member which is not shown. The gear element 28 is disposed in meshing relationship with another gear, not shown, disposed on a parallel shaft also not shown. This would be the conventional construction in a countershaft type transmission utilizing fluid operating clutches to establish and control the gear ratio connections between the countershaft and output shaft of such transmissions.

Rotary valve 26 includes a groove 52 which is in fluid communication with a clutch apply pressure passage 54. The passage 54 and groove 52 are in continual fluid communication with passages 32 and therefore apply chamber 36. The passage 54 is selectively pressurized by a conventional transmission control, not shown, to cause engagement of the clutch 10 by moving the piston 38 into abutment with one of the friction discs 16, which in turn will frictionally engage the friction discs 16 and 18. Under this condition, torque is transmitted between the gear 28 and the hub 14.

The valve 26 has a plurality of feed grooves 56 open to the groove 52 and a plurality of exhaust grooves 58 open to an exhaust groove 60. The grooves 56 and 58 can be selectively aligned with the passages 34 such that the chamber 44 can be in fluid communication with the pressure in passage 54 or with the exhaust groove 60. A connection with passage 34 is determined by the angular position of the valve 26 relative to hub 20. This angular position is established by the spline connection 22.

As seen in FIG. 2, the shaft 24 has a plurality of splines 62 which mesh in wide openings 64 formed between splines 66 which are disposed on the hub 20. When the shaft 24, as seen in FIG. 2, is being rotated in a clockwise direction; i.e., forward torque transmission, the spline drive surfaces will mate as shown. Under this condition, the grooves 58 are in fluid communication with passages 34 such that the chamber 44 will be connected to a low pressure oil source. The groove 60 is open to the openings 64 which are flooded or otherwise connected to lube oil in a well known manner. If torque is transmitted from the hub 14 through the clutch 10 to the shaft 24, the angular position of the splines 62 and 66 will change such that the grooves 56 will be aligned with the passages 34 and the chamber 44 will be open to the pressure in groove 52. At this time, the grooves 58 are closed from the passages 34.

During normal operation, with the clutch 10 applied and torque being transmitted from gear 28 to hub 14, the chamber 44 will be filled with lube oil. Since the clutch is rotating, centrifugal forces will act on the fluid in chamber 44 in opposition to the pressure in chamber 36. This will compensate to some degree for the centrifugal component of the pressure in chamber 36.

When a shift signal is given, another gear, not shown, within the transmission will be brought into action by its associated clutch member. As the on-coming gear is conditioned to accept torque transmission, a torque reduction at gear 28 will occur and eventually a torque reversal at gear 28 will occur thereby changing the angular position of the valve 26 relative to the hub 20. When this occurs, the chamber 44 will be filled with fluid at a pressure level equal to the pressure level in chamber 36 thereby greatly reducing the torque capacity of clutch 10 and substantially eliminating a shift shock which might otherwise occur. The pressure in passage 54 will be exhausted or otherwise controlled at the completion of the ratio interchange.

With most transmission structures, during the shift interchange, the pressure in passage 54 will be decreasing during a ratio interchange while the pressure in the on-coming clutch, not shown, will be increasing. However, at the point of torque reversal, torque reversal through clutch 10, the present invention will provide for compensation of both clutch apply pressure and centrifugally generating pressure to reduce the torque capacity of the clutch 10 to a level which will not support transient torques.

The speed and load sensitivity of the present invention are depicted in FIG. 3. It can be seen that the capacity ratio (forward capacity vs. reverse capacity) decreases as speed (rotary) and load (torque) increase. At high speed and high load, the capacity ratio approaches that of a double wrap brake band shown at line DB. The capacity ratio of band DB is a constant and is higher than the capacity ratio of a single wrap band SB.

The load lines represent increasing pressure values in the fluid available for engagement of the friction device. Capacity ratio in the range of 7.5 to 3.5 have been achieved in systems operating with clutch speeds in the range of zero (0) to 6000 rpm and a line pressure range of 60 to 120 psi.

While the invention is described in the preferred embodiment as being utilized with a rotating clutch, those skilled in the art will recognize that this invention is also useful with disc type brakes. As a general rule, centrifugal pressure compensation is not required with disc type brakes, however, apply pressure compensation may be desirable.

The disc type brakes are utilized with planetary type transmissions wherein the input and output members are coaxial. In such an arrangement, it would generally be established that the housing 12 would be stationary and the hub 14 would be connected with a gear member. Under this structural arrangement, the apply chamber 36 would not be subjected to rotation and therefore centrifugal compensation would not occur. However, torque reversal through the brake would occur such that the compensating chamber would be subjected to the same fluid pressure as the apply chamber, thus reducing torque overlap during a ratio interchange to provide smooth clutch operation.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A variable capacity fluid operated friction torque transmitting means comprising; torque transmitting means having a plurality of substantially equally spaced teeth disposed thereon; a hub member having a plurality of substantially equally spaced teeth disposed thereon meshing with the teeth on said torque transmitting means, the teeth being spaced such that relative angular displacement is permitted within a limited extent between said torque transmitting means and said hub; an output member; a plurality of friction discs disposed between said hub member and said output member with alternate ones of said discs being drivingly connected with respective ones of said hub member and said output member; piston means slidably disposed in said hub member and cooperating therewith to form a fluid apply fluid chamber having a predetermined effective area; a wall member positioned on said hub member, said piston and said wall member cooperating to provide an opposing fluid chamber on the opposite side of said piston means from said apply fluid chamber and having a smaller effective area than said predetermined effective area of said apply fluid chamber; first and second fluid passage means formed in said torque transmitting means; and valve means for connecting said first fluid passage means to both fluid chambers when said torque transmitting means and said hub member are at one end of the permitted relative angular displacement and for connecting said first passage means to said apply fluid chamber and for connecting said second passage means to said opposing fluid chamber when said torque transmitting means and said hub member are at another end of the permitted relative angular displacement.

2. A variable capacity clutch comprising; a torque transmitting shaft having a plurality of substantially equally spaced teeth disposed thereon; a hub member having a plurality of substantially equally spaced teeth disposed thereon meshing with the teeth on said torque transmitting shaft, the teeth being spaced such that relative angular displacement is permitted within a limited extent between said torque transmitting shaft and said hub; an output member; a plurality of friction discs disposed between said hub member and said output member with alternate ones of said discs being drivingly connected with respective ones of said hub member and said output member; piston means slidably disposed in said hub member and cooperating therewith to form a clutch apply fluid chamber a predetermined effective area; a wall member positioned on said hub member and having a seal portion slidably sealingly engaging said piston, said piston and said wall member cooperating to provide an opposing fluid chamber on the opposite side of said piston means from said clutch apply fluid chamber and having a smaller effective area than said clutch apply fluid chamber; first and second fluid passage means formed in said torque transmitting shaft; and passage means in said hub being effective to connect said first fluid passage means to both fluid chambers when said torque transmitting shaft and said hub member are at one end of the permitted relative angular displacement and being effective to connect said first passage means to said clutch apply fluid chamber and to connect said second passage means to said opposing fluid chamber when said torque transmitting shaft and said hub member are at another end of the permitted relative angular displacement.

* * * * *